(12) United States Patent
Fleyder et al.

(10) Patent No.: US 9,912,692 B1
(45) Date of Patent: Mar. 6, 2018

(54) POINT OF SALE SYSTEM PROTECTION AGAINST INFORMATION THEFT ATTACKS

(71) Applicant: EMC Corporation, Hopkinton, MA (US)

(72) Inventors: Uri Fleyder, Giv'at Shmuel (IL); Rotem Kerner, Tel Aviv (IL); Zeev Rabinovich, Tel Aviv (IL); Rotem Salinas, Netanya (IL); Lior Ben-Porat, Petah Tikva (IL); Daniel Frank, Giv'at Shmuel (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 213 days.

(21) Appl. No.: 14/671,578

(22) Filed: Mar. 27, 2015

(51) Int. Cl.
*H04L 29/06* (2006.01)
*G06Q 20/20* (2012.01)
*G06F 21/62* (2013.01)

(52) U.S. Cl.
CPC ...... *H04L 63/1466* (2013.01); *G06F 21/6245* (2013.01); *G06Q 20/20* (2013.01)

(58) Field of Classification Search
CPC ............ H04L 63/1416; H04L 63/1441; G06F 21/6245; G06F 21/53; G06F 2221/031; G06Q 20/20
See application file for complete search history.

(56) References Cited

U.S. PATENT DOCUMENTS

| | | | | |
|---|---|---|---|---|
| 9,225,695 B1* | 12/2015 | Riera | ................... | G06F 21/6245 |
| 2006/0036699 A1* | 2/2006 | Bauchot | ............... | G06Q 10/107 |
| | | | | 709/206 |
| 2007/0016948 A1* | 1/2007 | Dubrovsky | ......... | H04L 63/1433 |
| | | | | 726/22 |
| 2010/0058479 A1* | 3/2010 | Chen | ....................... | G06F 21/83 |
| | | | | 726/26 |
| 2013/0152207 A1* | 6/2013 | Cui | ....................... | G06F 21/566 |
| | | | | 726/26 |
| 2013/0254117 A1* | 9/2013 | von Mueller | ...... | G06Q 20/3829 |
| | | | | 705/71 |
| 2013/0263226 A1* | 10/2013 | Sudia | .................. | H04L 63/1466 |
| | | | | 726/4 |
| 2014/0012724 A1* | 1/2014 | O'leary | .............. | G06Q 20/4016 |
| | | | | 705/35 |
| 2015/0304736 A1* | 10/2015 | Lal | .......................... | G06F 21/10 |
| | | | | 380/210 |
| 2015/0319183 A1* | 11/2015 | Liske | ................... | H04L 63/1416 |
| | | | | 726/23 |

(Continued)

*Primary Examiner* — Mohammad A Siddiqi
(74) *Attorney, Agent, or Firm* — Ryan, Mason & Lewis, LLP (57) ABSTRACT

A method includes selectively implementing, via a component resident and executing on a point of sale system, one or more of a set of proactive operations to counter an information theft attack against the point of sale system. The set of proactive operations comprises: generating false information that appears to be actual information and creating at least one process executable in the point of sale system that comprises the false information; injecting false information that appears to be actual information into at least one process executing in the point of sale system; replacing actual information with false information that appears to be actual information; and blocking at least one process in the point of sale system to prevent actual information from being taken from the point of sale system.

20 Claims, 4 Drawing Sheets

(56) References Cited

U.S. PATENT DOCUMENTS

2016/0057166 A1\* 2/2016 Chesla .................... H04L 63/02
                                                                                 726/23
2016/0189117 A1\* 6/2016 Sandraz ................ G06Q 20/20
                                                                                705/16

\* cited by examiner

POINT OF SALE SYSTEM PROTECTION AGAINST INFORMATION THEFT ATTACKS

FIELD

The field relates generally to point of sale (POS) systems, and more particularly to protecting such systems from information theft attacks such as random access memory (RAM) scraping attacks.

BACKGROUND

A large number of merchants and retail companies (including large, medium and small sized merchants and retailers) are losing millions of dollars (both directly and indirectly) as a result of POS system breaches caused by POS malware (malicious software) which is using the RAM scraping technique to siphon credit card data from compromised devices. RAM scraping involves extracting credit card information from the volatile (RAM) memory of the POS system.

Currently the problem is addressed by various vendors of security and anti-fraud (AF) solutions. Some security vendors are offering standard anti-virus (AV) and anti-malware (AM) solutions. However, most of the merchants and retailers do not install these solutions because of performance (e.g., these solutions are very resource demanding and degrade the ability of POS systems to process high amounts of transactions per day) and reliability (e.g., the most successful AV and AM solutions can detect, on average, less than 40% of current threats) issues.

Most of the AF solutions vendors are offering post breach services in the form of providing lists of compromised credit card numbers (e.g., collected by intelligence agents from the underground forums and stolen credit cards marketplaces) to the issuing financial institutions so they can blacklist and block them.

These solutions are evidently not good enough as the number of credit card breach related incidents are constantly on the rise (e.g., especially in the U.S.).

SUMMARY

Embodiments of the invention provide techniques for protecting POS systems from information theft attacks.

For example, in one embodiment, a method comprises selectively implementing, via a component resident and executing on a point of sale system, one or more of a set of proactive operations to counter an information theft attack against the point of sale system. The set of proactive operations comprises: generating false information that appears to be actual information and creating at least one process executable in the point of sale system that comprises the false information; injecting false information that appears to be actual information into at least one process executing in the point of sale system; replacing actual information with false information that appears to be actual information; and blocking at least one process in the point of sale system to prevent actual information from being taken from the point of sale system.

Advantageously, illustrative embodiments provide techniques to protect POS systems from targeted and opportunistic information theft attacks such as RAM scraping attacks (usually carried out by POS malware) in real time. For example, in one illustrative embodiment, a lightweight agent, installed on a POS system (i.e., a component resident and executing on the POS system) that processes credit card data, protects the data using delusion and/or blocking techniques.

These and other features and advantages of the invention will become more readily apparent from the accompanying drawings and the following detailed description.

DETAILED DESCRIPTION

Illustrative embodiments may be described herein with reference to exemplary cloud infrastructure, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data center," "data processing system," "computing system," "data storage system," and the like as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, a POS system refers to any device which processes payment methods. By way of non-limiting examples only, a POS system can be a sales register machine in a local grocery store or any other retail store, or a personal computer or mobile device (e.g., smart phone) when providing it with a credit card number (or other payment information) to buy some goods or services online.

It is important to note that most POS systems are running common, outdated and unpatched operating systems practically without any protection, anti-malware or network monitoring solutions in place.

Because of the high volume of money transfers in commercial cash registers and stores, most of the fraudsters, i.e., cyber-criminals, are focusing and targeting them. However, POS malware may infect a home or corporate computer as well.

As used herein, a regular expression refers to a sequence of characters that forms a search pattern. One can use a regular expression to find different words, number combinations and patterns. In the case of POS malware, regular expressions can be used to find the different credit card track information, such as credit card number, expiration date, and the name of the card holder, in the RAM memory of the POS system.

As used herein, RAM scraping refers to extracting plain text data from a system's volatile (RAM) memory. When a credit card number or any other sensitive information is entered into a device without first encrypting or tokenizing the information, anyone who dumps the system's RAM memory will be able to find and see this data using simple strings and regular expressions search.

As mentioned above, existing AF, AV and AM techniques for countering information theft attacks such as RAM scraping to defraud POS systems are inadequate, as evidenced by the rise of credit card data breaches that retailers are reporting today.

Embodiments of the invention address the above and other drawbacks associated with such information theft attacks. By adding the ability to block RAM scraping attempts while generating alternative (false) credit card numbers (delusion) in real time (using a lightweight agent installed on the client POS system), illustrative embodiments are able to protect POS systems against this prevalent threat (without degrading the performance or reliability of the working system).

Figure 1:
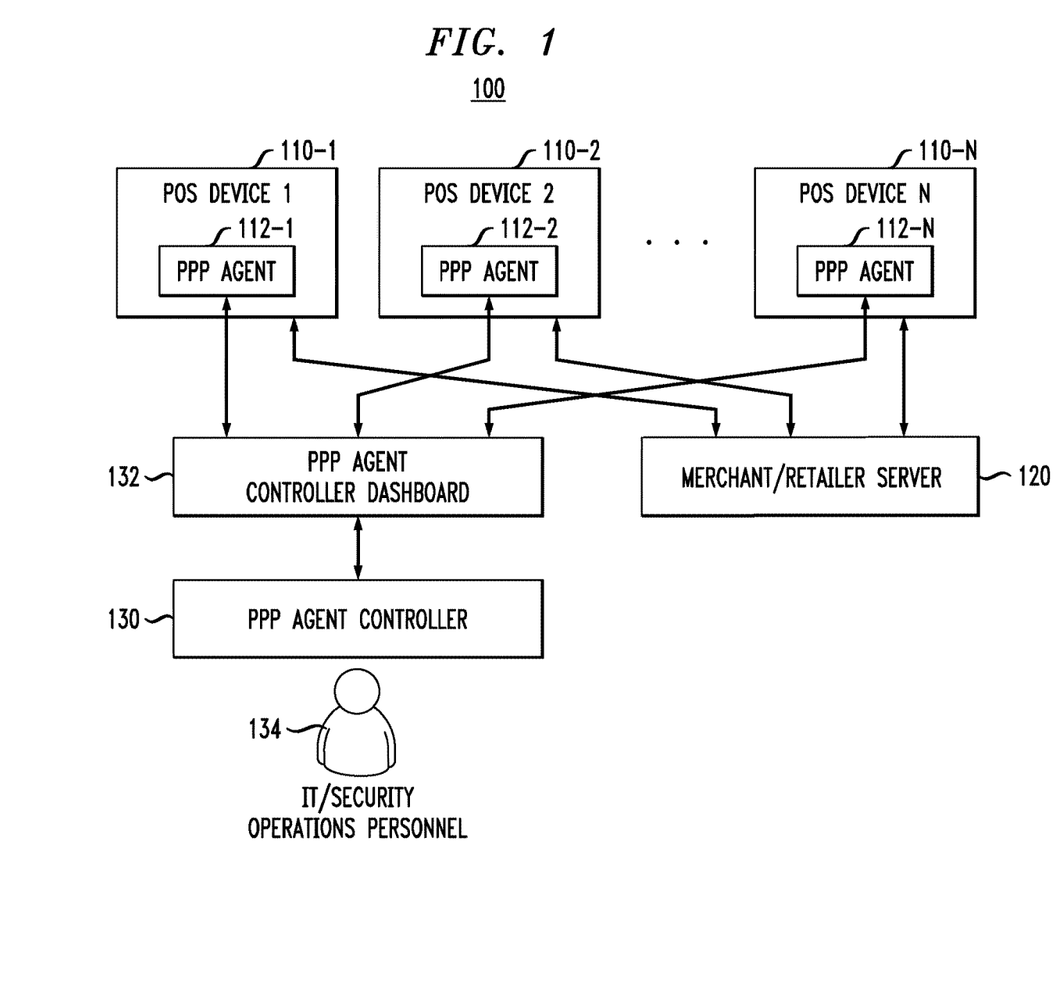
FIG. 1 illustrates a point of sale system environment with information theft protection according to an embodiment of the invention.

FIG. 1 illustrates a point of sale system environment 100 with information theft protection according to an embodiment of the invention. As shown, a plurality of POS (systems) devices 110-1, 110-2, . . . , 110-N are operatively coupled to a merchant/retailer server 120. The POS devices could be, by way of example only and as mentioned above, sales registers in one or more retail stores, or laptops or smart phones used to make e-commerce purchases. In each case, it is to be appreciated that the POS device is the point in the sales transaction where a purchaser's sensitive information, such as credit card numbers or other payment information, is entered. The server 120 is a backend server that hosts the retailer's purchasing system (and e-commerce application in the case of an online retailer). The POS devices transmit the entered payment information to the server. Thus, the POS devices are considered client devices. However, it is to be understood that embodiments of the invention are not limited to any particular POS device/server arrangement.

In accordance with illustrative embodiments of the invention, each POS device 110-1, 110-2, . . . , 110-N has resident thereon, in the form of a software component loaded thereon, a POS proactive protection (PPP) agent, respectively denoted as 112-1, 112-2, . . . , 112-N. The PPP agents are operatively coupled to a PPP agent controller 130 via a PPP agent interface (dashboard) 132. The controller 130 and dashboard 132 can be a computer system with a graphical user interface that is responsive to selections and entries made by information technology (IT) personnel and/or security operations personnel 134. In one embodiment, the controller 130 and dashboard 132 provide a centralized controlling and monitoring web-based interface for the personnel 134. The PPP agent controller 130 controls modes of operation that can be enabled/disabled through the dashboard 132 (by the personnel 134) that cause the PPP agent to execute certain programmed steps, as will be further explained below. It is to be understood that each mode can work independently or combined with any of the other modes. The controller 130 and dashboard 132 also allow the personnel 134 to monitor RAM scraping attacks within the network (e.g., client-server arrangement formed by POS devices 110-1, 110-2, . . . , 110-N and server 120).

Figure 2:
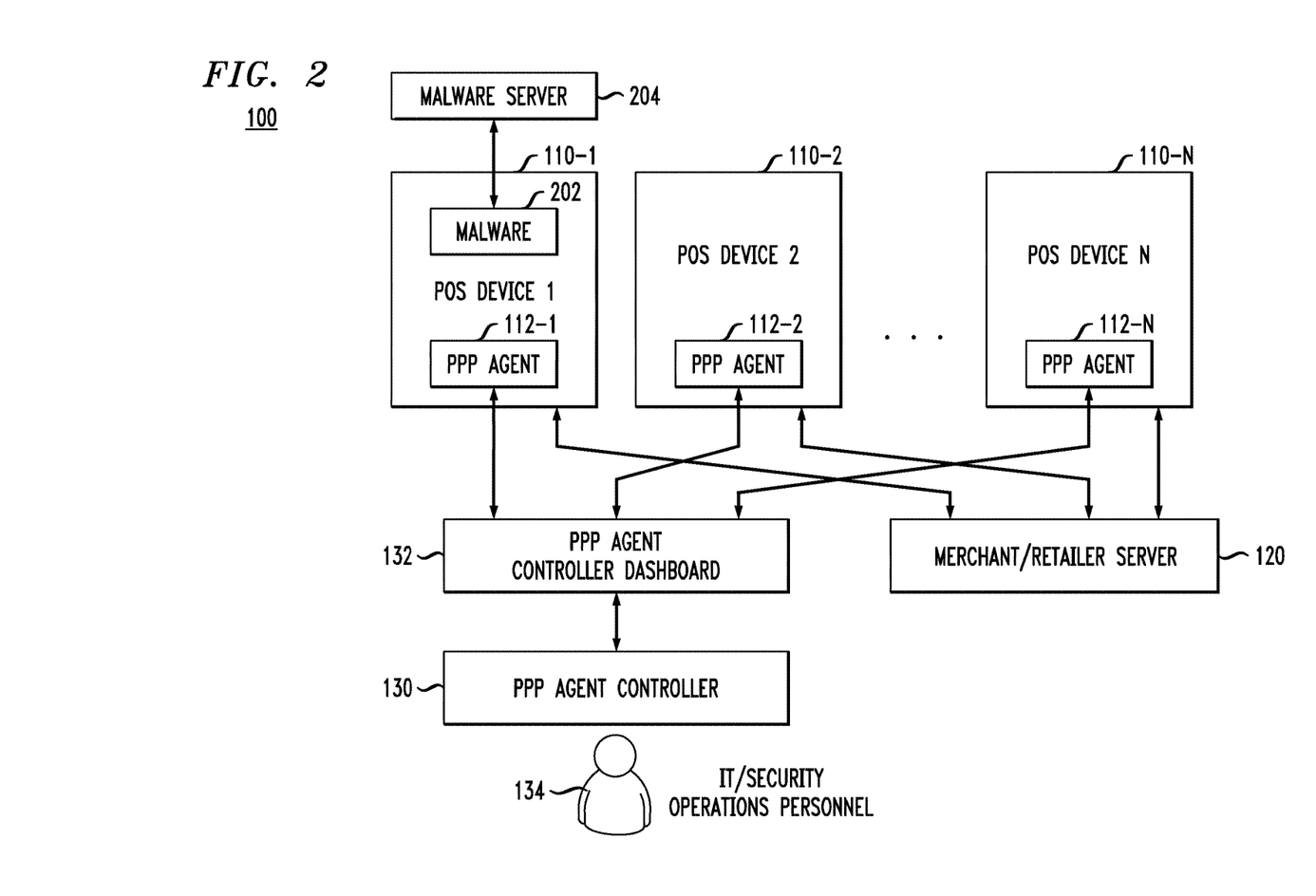
FIG. 2 illustrates the point of sale system environment with information theft protection of FIG. 1 with malware operative to perform an information theft attack.

FIG. 2 illustrates the point of sale system environment with information theft protection of FIG. 1 (using the same reference numerals) but with POS malware 202 loaded on POS device 110-1. In this example, POS malware 202 is assumed to be configured to perform a RAM scraping attack whereby the malware attempts to extract credit card information from the RAM of POS device 110-1 and send the credit card information to a remote malware server 204 for further cyber-criminal activities as will be illustrated below in exemplary use cases. While FIG. 2 shows such malware loaded only on one POS device, it is to be understood that such malware could be resident on one or more other POS devices.

Embodiments of the invention provide a methodology for generating, injecting and/or replacing credit card data while effectively blocking RAM scraping attempts on compromised POS systems, such as POS device 110-1. These operations are performed by the PPP agents; in this example of FIG. 2, by PPP agent 112-1.

More particularly, the PPP agent is configured to selectively implement one or more operational modes. These operational modes are selected by personnel 134 via controller 130 and dashboard 132, as explained above. In an illustrative embodiment, the PPP agent supports the following (four) operational modes which can work independently or combined with any of the other modes. It is also to be understood that one or more of the operational modes can be initiated before or after the malware is detected, or even absent detection of the malware.

Generation Mode.

In this operational mode, the PPP agent 112-1 generates false information in the form of fake credit card (CC) records (e.g., numbers, expiration dates and additional information as required). The rate of fake records generation is adjustable and can be configured by the controller 130 (e.g., 1 record per minute, 10 records per minute, 100 records per minute, 1000 records per minute, etc.).

During the generation process, the fake CC records are being validated by the same methods the fraudsters are using to validate stolen CC records, e.g., Real BIN (Bank Identifier) numbers, Luhn-10 algorithm, valid expiration date, etc.

The generator in the PPP agent creates a new process on the POS device 110-1. The process name will be provided by the controller 130 or alternatively will be chosen from a predefined pool of real POS device process names (for delusion purposes).

The POS malware 202 running on POS device 110-1 will extract (siphon) the fake CC records from RAM memory of the POS device and send them to the malware server 204.

Injection Mode.

In this operational mode, the PPP agent 112-1 injects the stream of fake CC records (generated as described above) into a running process on the POS device 110-1 to make it seem even more reliable (from the fraudster's point of view) for better delusion.

Again, here, the POS malware 202 running on the POS device 110-1 will siphon the fake CC records from RAM memory and send them to the malware server 204.

Replacement Mode.

In this operational mode, the PPP agent 112-1 detects illegal attempts to steal CC records in real time and replaces the targeted records (while in transit) with fake ones (delusion). More specifically, the PPP agent 112-1 detects the RAM scraping attempts, identifies real (actual) credit card numbers while they are being scraped by the POS malware 202 and replaces them in transit, i.e., before the malware can collect, save and transmit them to the malware server 204.

Again, here, the POS malware 202 running on the POS device 110-1 will siphon the fake CC records from RAM memory and send them to the malware server 204.

Blocking Mode.

In this mode, the PPP agent 112-1 blocks the RAM scraping attempts by restricting and eliminating access to specific operating system (OS) functions which are required to complete this task. It is to be appreciated that there are a variety of OS functions which may be abused by the malware 202 for RAM scraping and RAM scraping related functionality, e.g., ReadProcessMemory( ), OpenProcess( ), CreateToolhelp32Snapshot( ), CreateRemoteThread( ), and LookupPrivilegeName( ). One or more of these and additional functions can be blocked or filtered by the PPP agent 112-1 using code hooking techniques.

In this mode, the POS malware 202 running on the POS device 110-1 will fail to perform RAM scraping attempts, consequently failing to siphon CC records.

Given the operational modes described above, some non-limiting exemplary use cases are now described.

Assume that a POS system (device 110-1) located in a branch of a large retail company in the U.S. is infected with a POS malware (202), e.g., "Backoff" Trojan, controlled by a financially motivated attacker (aka "fraudster").

The malware 202 starts to enumerate all the running processes on the compromised device, then reads the device's volatile (RAM) memory (RAM scraping) and uses several predefined regular expressions to find CC related data (e.g., CC Track 1, CC Track 2 and CC Track 3). Once the malware 202 finds CC data records, it transmits them to its command and control server (server 204), controlled and monitored by the fraudster.

Upon receiving stolen CC data records to its server, the fraudster will use the data to clone credit cards (write the stolen details on top of the magnetic stripe of empty plastic cards) or just upload the stolen information to underground forums and CC marketplaces with the intention to sell them to other fraudsters. The fraudster cannot tell whether the CC numbers are actually valid before trying to pay using them, which may trigger the CC issuing company to block the CC number in question; not to mention the high amounts of CC data records involved in typical CC breaches (e.g., thousands to millions of data records), those are the reasons why the fraudsters are selling the stolen records on an "as-is" basis.

Without the PPP agent and corresponding PPP controller/dashboard, the fraudster would receive many real and valid CC data records, causing the targeted company (merchant/retailer) heavy money losses (direct and indirect) due to fraud and significant damage to its reputation and brand.

In case the company is using the PPP techniques (installed on targeted POS systems), the fraudster will not receive any CC data records in case the blocking mode has been enabled or alternatively he will receive many fake CC data records (the fraudster cannot tell they are fake) in case one of the delusion modes have been enabled (generation, injection and replacement).

In any of the above scenarios, the fraudster will not be able to cause any damage to the targeted organization, since he does not have CC data records or all/most of the data records he has are fake.

Moreover, use of the delusion mode will lower the fraudster's reputation in the underground forum (for selling fake CC data records), causing the fraudster to abandon any further attacks against the merchant/retailer company protected by the PPP agent(s) and maybe even to get them out of this illegal business.

Figure 3:
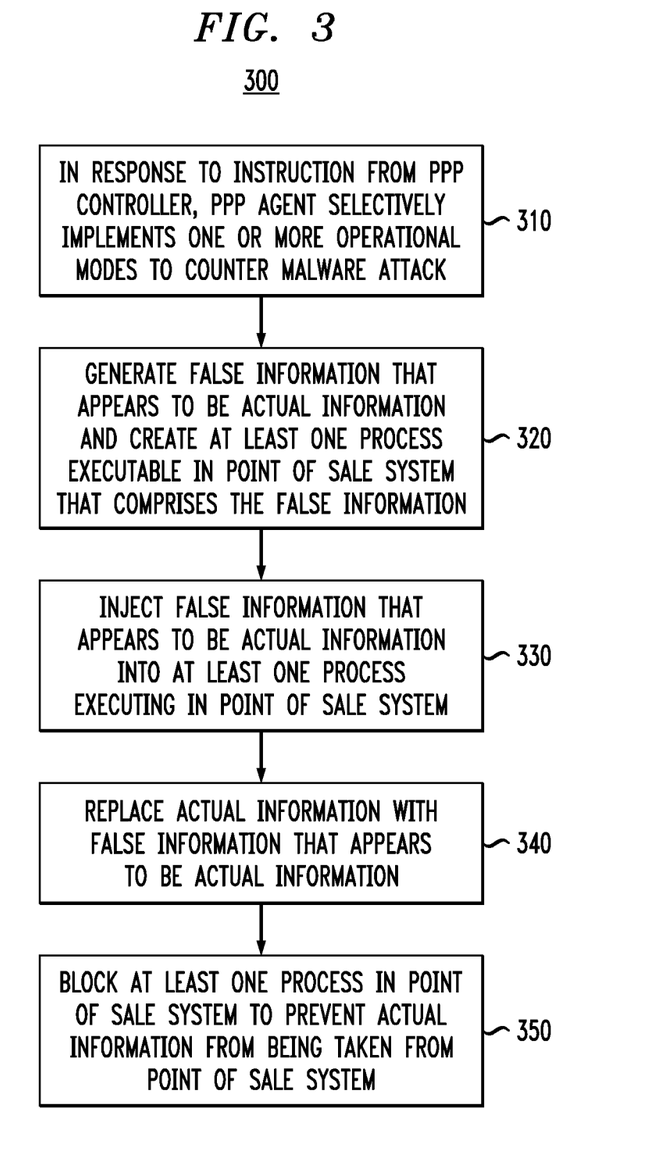
FIG. 3 illustrates a point of sale information theft protection methodology according to an embodiment of the invention.

FIG. 3 illustrates a point of sale information theft protection methodology 300 performed in a POS system (e.g., device 110-1) according to an embodiment of the invention.

In step 310, in response to instruction from a PPP controller (e.g., controller 130), a PPP agent (agent 112-1) selectively implements one or more operational modes to counter a malware (e.g., malware 202) attack. The modes are executed via steps 320, 330, 340 and 350.

In step 320, the PPP agent generates false information that appears to be actual information and creates at least one process executable in the POS system that comprises the false information.

In step 330, the PPP agent injects false information that appears to be actual information into at least one process executing in the POS system.

In step 340, the PPP agent replaces actual information with false information that appears to be actual information.

In step 350, the PPP agent blocks at least one process in the POS system to prevent actual information from being taken from the point of sale system.

Figure 4:
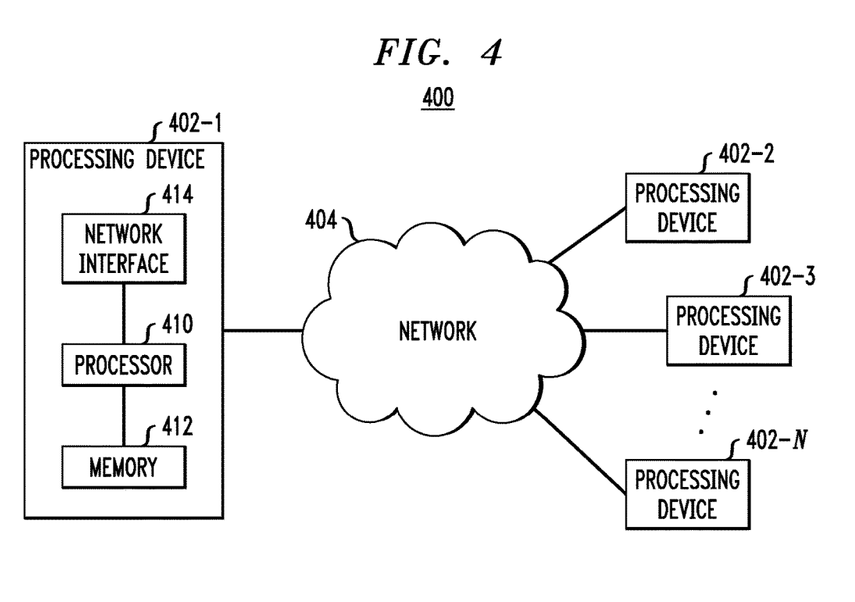
FIG. 4 illustrates a processing platform used to implement a point of sale system environment with information theft protection according to an embodiment of the invention.

As an example of a processing platform on which a POS system environment with information theft protection (e.g., 100 in FIG. 1) may be implemented is processing platform 400 shown in FIG. 4. The processing platform 400 in this embodiment comprises a plurality of processing devices, denoted 402-1, 402-2, 402-3, . . . 402-N, which communicate with one another over a network 404. It is to be appreciated that the information theft protection methodologies described herein may be executed in one such processing device 402, or executed in a distributed manner across two or more such processing devices 402. The data storage system may be implemented in a cloud infrastructure environment which may also be executed in a distributed manner across two or more such processing devices 402. The information theft protection functionality described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 4, such a device generally comprises at least one processor and an associated memory, and implements one or more functional modules for instantiating and/or controlling features of systems and methodologies described herein. Multiple elements or modules may be implemented by a single processing device in a given embodiment.

The processing device 402-1 in the processing platform 400 comprises a processor 410 coupled to a memory 412. The processor 410 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 410. Memory 412 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 412 may comprise electronic memory such as random access memory (RAM), read-only memory (ROM) or other types of memory, in any combination. The one or more software programs when executed by a processing device such as the processing device 402-1 cause the device to perform functions associated with one or more of the components/steps of system/methodologies in FIGS. 1-3. One skilled in the art would be readily able to implement such software given the teachings provided herein. Other examples of processor-readable storage media embodying embodiments of the invention may include, for example, optical or magnetic disks.

Processing device 402-1 also includes network interface circuitry 414, which is used to interface the device with the network 404 and other system components. Such circuitry may comprise conventional transceivers of a type well known in the art.

The other processing devices 402 (402-2, 402-3, . . . 402-N) of the processing platform 400 are assumed to be configured in a manner similar to that shown for processing device 402-1 in the figure.

The processing platform 400 shown in FIG. 4 may comprise additional known components such as batch processing systems, parallel processing systems, physical machines, virtual machines, virtual switches, storage volumes, etc. Again, the particular processing platform shown in this figure is presented by way of example only, and the system environment shown as 100 in FIG. 1 may include additional or alternative processing platforms, as well as numerous distinct processing platforms in any combination.

Also, numerous other arrangements of servers, clients, computers, storage devices or other components are possible in processing platform 400. Such components can communicate with other elements of the processing platform 400 over any type of network, such as a wide area network (WAN), a local area network (LAN), a satellite network, a telephone or cable network, or various portions or combinations of these and other types of networks.

Furthermore, it is to be appreciated that the processing platform 400 of FIG. 4 can comprise virtual machines (VMs) implemented using a hypervisor. A hypervisor is an example of what is more generally referred to herein as "virtualization infrastructure." The hypervisor runs on physical infrastructure. Processing platform 400 may also include multiple hypervisors, each running on its own physical infrastructure. Portions of that physical infrastructure might be virtualized.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
    providing, via a software component resident and executing on a point of sale system, a plurality of proactive operational modes selectable by at least one entity through a control and monitoring interface associated with the software component, wherein the proactive operational modes are operative to counter one or more information theft attacks attempting to obtain information comprising sensitive data, entered through the point of sale system, from a volatile memory of the point of sale system, wherein the one or more information theft attacks are initiated by malware resident on the point of sale system, and wherein the proactive operational modes comprise:
        a first operational mode configured to utilize false information, wherein the false information comprises false sensitive data generated to appear to be real sensitive data, by creating at least one process executable in the point of sale system that comprises the false information;
        a second operational mode configured to utilize false information, wherein the false information comprises false sensitive data generated to appear to be real sensitive data, by injecting the false information into at least one process executing in the point of sale system;
        a third operational mode configured to utilize false information, wherein the false information comprises false sensitive data generated to appear to be real sensitive data, during a given information theft attack that is detected to be in progress by replacing real information from the volatile memory of the point of sale system that is in transit during the given information theft attack with the false information; and
        a fourth operational mode configured to restrict access to at least one operating system function in the point of sale system usable by a given information theft attack to obtain the information from the volatile memory of the point of sale system;
    receiving, at the software component, a selection of one or more of the plurality of proactive operational modes; and
    implementing, via the software component, the one or more selected proactive operational modes;
    wherein the point of sale system comprises a processor and memory configured to execute the software component.

2. The method of claim 1, wherein the at least one created process appears to be a real process executable in the point of sale system.

3. The method of claim 1, further comprising validating the generated false information in a manner in which the real information is validated.

4. The method of claim 1, wherein at least one of the plurality of proactive operational modes is initiated after detection of the malware.

5. The method of claim 1, wherein at least one of the plurality of proactive operational modes is initiated before detection of the malware.

6. The method of claim 1, wherein the volatile memory comprises random access memory, and wherein a given information theft attack comprises a scraping attack of the random access memory.

7. The method of claim 1, wherein the control and monitoring interface enables the at least one entity to adjust a rate of generation of the false information.

8. The method of claim 1, wherein the control and monitoring user interface enables the at least one entity to detect that the given information theft attack is in progress.

9. An article of manufacture comprising a processor-readable storage medium having encoded therein executable code of one or more software programs, wherein the one or more software programs when executed by a processor and a memory associated with a point of sale system perform steps of:

providing, via a software component resident and executing on a point of sale system, a plurality of proactive operational modes selectable by at least one entity through a control and monitoring interface associated with the software component, wherein the proactive operational modes are operative to counter one or more information theft attacks attempting to obtain information comprising sensitive data, entered through the point of sale system, from a volatile memory of the point of sale system, wherein the one or more information theft attacks are initiated by malware resident on the point of sale system, and wherein the proactive operational modes comprise:
a first operational mode configured to utilize false information, wherein the false information comprises false sensitive data generated to appear to be real sensitive data, by creating at least one process executable in the point of sale system that comprises the false information;
a second operational mode configured to utilize false information, wherein the false information comprises false sensitive data generated to appear to be real sensitive data, by injecting the false information into at least one process executing in the point of sale system;
a third operational mode configured to utilize false information, wherein the false information comprises false sensitive data generated to appear to be real sensitive data, during a given information theft attack that is detected to be in progress by replacing real information from the volatile memory of the point of sale system that is in transit during the given information theft attack with the false information; and
a fourth operational mode configured to restrict access to at least one operating system function in the point of sale system usable by a given information theft attack to obtain the information from the volatile memory of the point of sale system;
receiving, at the software component, a selection of one or more of the plurality of proactive operational modes; and
implementing, via the software component, the one or more selected proactive operational modes.

10. The article of claim 9, wherein the control and monitoring interface enables the at least one entity to adjust a rate of generation of the false information.

11. The article of claim 9, wherein the control and monitoring user interface enables the at least one entity to detect that the given information theft attack is in progress.

12. An apparatus comprising:
a processor operatively coupled to a memory to form a point of sale system configured to:
provide, via a software component resident and executing on the point of sale system, a plurality of proactive operational modes selectable by at least one entity through a control and monitoring interface associated with the software component, wherein the proactive operational modes are operative to counter one or more information theft attacks attempting to obtain information comprising sensitive data, entered through the point of sale system, from a volatile memory of the point of sale system, wherein the one or more information theft attacks are initiated by malware resident on the point of sale system, and wherein the proactive operational modes comprise:
a first operational mode configured to utilize false information, wherein the false information comprises false sensitive data generated to appear to be real sensitive data, by creating at least one process executable in the point of sale system that comprises the false information;
a second operational mode configured to utilize false information, wherein the false information comprises false sensitive data generated to appear to be real sensitive data, by injecting the false information into at least one process executing in the point of sale system;
a third operational mode configured to utilize false information, wherein the false information comprises false sensitive data generated to appear to be real sensitive data, during a given information theft attack that is detected to be in progress by replacing real information from the volatile memory of the point of sale system that is in transit during the given information theft attack with the false information; and
a fourth operational mode configured to restrict access to at least one operating system function in the point of sale system usable by a given information theft attack to obtain the information from the volatile memory of the point of sale system;
receive, at the software component, a selection of one or more of the plurality of proactive operational modes; and
implement, via the software component, the one or more selected proactive operational modes.

13. The apparatus of claim 12, wherein the at least one created process appears to be a real process executable in the point of sale system.

14. The apparatus of claim 13, wherein the processor is further configured to validate, via the software component, the generated false information in a manner in which the real information is validated.

15. The apparatus of claim 12, wherein at least one of the plurality of proactive operational modes is initiated after detection of the malware.

16. The apparatus of claim 12, wherein at least one of the plurality of proactive operational modes is initiated before detection of the malware.

17. The apparatus of claim 12, wherein the control and monitoring interface enables the at least one entity to adjust a rate of generation of the false information.

18. The apparatus of claim 12, wherein the control and monitoring user interface enables the at least one entity to detect that the given information theft attack is in progress.

19. A system comprising:
one or more point of sale systems each comprising a processor operatively coupled to a memory, wherein the processor of a given one of the point of sale systems is configured to execute a software component resident on the given point of sale system; and
a controller remote from the one or more point of sale systems, wherein the controller is associated with at least one entity;
wherein the software component is configured to:
provide a plurality of proactive operational modes selectable by the at least one entity through a control and monitoring interface associated with the software component and operatively coupled to the controller, wherein each one of the plurality of proactive operational modes is operative to counter one or more information theft attacks attempting to obtain information comprising sensitive data, entered through the given point of sale system, from volatile memory of the given point of sale system, wherein the one or more information theft attacks are initiated by malware resident on the given point of sale system, and wherein the proactive operational modes comprise:
a first operational mode configured to utilize false information, wherein the false information comprises false sensitive data generated to appear to be real sensitive data, by creating at least one process executable in the given point of sale system that comprises the false information;
a second operational mode configured to utilize false information, wherein the false information comprises false sensitive data generated to appear to be real sensitive data, by injecting the false information into at least one process executing in the given point of sale system;
a third operational mode configured to utilize false information, wherein the false information comprises false sensitive data generated to appear to be real sensitive data, during a given information theft attack that is detected to be in progress by replacing real information from the volatile memory of the point of sale system that is in transit during the given information theft attack with the false information; and
a fourth operational mode configured to restrict access to at least one operating system function in the given point of sale system usable by a given information theft attack to obtain the information from the volatile memory of the given point of sale system;
receive a selection of one or more of the plurality of proactive operational modes; and
implement the one or more selected proactive operational modes.

20. The system of claim 19, wherein the control and monitoring interface enables the at least one entity remote from the one or more point of sale systems to adjust a rate of generation of the false information.

\* \* \* \* \*